(12) United States Patent
Romain

(10) Patent No.: US 6,341,299 B1
(45) Date of Patent: Jan. 22, 2002

(54) MODULAR ARITHMETIC COPROCESSOR ENABLING THE PERFORMANCE OF NON-MODULAR OPERATIONS AT HIGH SPEED

(75) Inventor: Fabrice Romain, Aix en Provence (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/253,681

(22) Filed: Feb. 19, 1999

(30) Foreign Application Priority Data

Feb. 26, 1998 (FR) .............................................. 98 02499

(51) Int. Cl.⁷ .............................. G06F 7/48; G06F 7/72
(52) U.S. Cl. ...................................... 708/523; 708/491
(58) Field of Search ................................. 708/523, 501, 708/603, 491

(56) References Cited

U.S. PATENT DOCUMENTS

| | | | | |
|---|---|---|---|---|
| 5,457,804 A | * | 10/1995 | Ohtomo | 708/523 |
| 5,583,804 A | * | 12/1996 | Seal et al. | 708/523 |
| 5,941,940 A | * | 8/1999 | Prasad et al. | 708/523 |
| 6,035,319 A | * | 3/2000 | Jong et al. | 708/523 |
| 6,175,849 B1 | * | 1/2001 | Smith | 708/523 |

FOREIGN PATENT DOCUMENTS

| | | | |
|---|---|---|---|
| EP | 0 435 399 A1 | 12/1990 | G06F/7/544 |
| EP | 0 678 807 A1 | 4/1995 | G06F/7/544 |
| EP | 0 793 165 A1 | 2/1997 | G06F/7/72 |
| WO | 93/25959 | 12/1993 | G06F/7/544 |

* cited by examiner

*Primary Examiner*—David H. Malzahn
(74) *Attorney, Agent, or Firm*—Lisa K. Jorgenson; Allen, Dyer, Doppelt, Milbrath & Gilchrist, P.A.

(57) ABSTRACT

The computation time of modular operations on large-format data is improved by using a computation circuit integrated as a modular arithmetic coprocessor. The computation circuit carries out an S=A*B+C type operation, with S and C encoded on 2*Bt bits, and A and B encoded on Bt bits. To carry out this operation, a storage flip-flop circuit enables the storage of a possible overflow carry value at the end of an elementary computation, and reinserts this carry value during the following computation.

13 Claims, 5 Drawing Sheets

MODULAR ARITHMETIC COPROCESSOR ENABLING THE PERFORMANCE OF NON-MODULAR OPERATIONS AT HIGH SPEED

FIELD OF THE INVENTION

The invention relates to the field of microprocessors, and, more particularly, to a modular arithmetic coprocessor that performs non-modular operations.

BACKGROUND OF THE INVENTION

The Montgomery method makes it possible to carry out modular computations in a finite field (or Galois field) denoted as $GF(2^n)$, without the performance of divisions. Conventionally, modular operations on $GF(2^n)$ are used in cryptography for applications such as authentication of messages, identification of a user, and exchange of cryptographic keys. Exemplary applications are described in the French Patent Application No. 2,679,054.

There are commercially available integrated circuits dedicated to such applications. These include, for example, the product referenced as ST16CF54, which is manufactured by SGS-THOMSON MICROELECTRONICS. This product is built around a central processing unit and an arithmetic coprocessor, and is dedicated to the performance of modular computations. The coprocessor enables the processing of modular multiplication operations using the Montgomery method. Further information on this coprocessor can be found in the U.S. Pat. No. 5,513,133.

The basic operation, called a $P_{field}$ operation, is implemented by this coprocessor. Three binary data elements A (multiplicand), B (multiplier), and N (modulo) are encoded on a whole number n of bits. This is done for a binary data element denoted as $P_{field}(A, B)_N$ which is encoded on n bits such that $P_{field}(A, B)_N = A*B*I$ mod N. I is a binary data element, called an error, which is encoded on n bits such that $I = 2^{-n}$ mod N. More specifically, the value of I depends on the number of k bit blocks considered for the encoding of A, with k being an integer. To perform the operation $A*B*I$ mod N, the data elements are assumed to have been encoded on m words of k bits, with m and k being integers and $m*k=n$. The words of the data elements A and B are provided to a multiplication circuit having a series input to receive B, a parallel input to receive the k bit blocks of A, and a series output.

In the referenced U.S. Pat. No. 5,513,133, the coprocessor operates with $k=32$ and $m=8$ or 16. The coprocessor may be used to produce the result of the modular multiplication $A*B$ mod N. The modular multiplication can be subdivided into two successive elementary $P_{field}$ operations. $P_{field}$ ($P_{field}(A, B)_N$, $H)_N$ is computed with H being a data element encoded on n bits, called an error correction parameter, which is equal to $2^{2n}$ mod N. For further details on the implementation of modular multiplication, reference may be made to the above referenced U.S. patent. Several possibilities of computation are already known. They include the use either a software method or a specialized circuit, such as the one illustrated in the referenced U.S. patent.

The circuit illustrated in FIG. 1 includes three shift registers 10, 11 and 12 with a series input and output. These registers include n number of cells, with $n=m*k$. Multiplexers 13, 14 and 15 are placed respectively before the inputs of the registers 10, 11 and 12. The circuit also includes three registers 16, 17 and 18 with a series input and a parallel output, with each register having k cells. Two multiplication circuits 19 and 20 include a series input, a parallel input, and a series output. The circuit further includes two k-cell registers 21 and 22, multiplexers 24, 25, 26, 36, 37 and 38, a demultiplexer 39, series subtraction circuits 27, 28 and 29, series addition circuits 30 and 31, delay cells 32, 33 and 34 to delay the propagation of binary data elements by k cycle periods, and a comparison circuit 35. For further details on the arrangements of the different elements with respect to each other, reference may be made to the referenced U.S. patent.

The use of the circuit shown in FIG. 1 enables optimizing in terms of computing duration, memory size, etc. of the processing of modular operations using a fixed data size, e.g., in this case 256 or 512 bits. Cryptography requires machines with increasingly high performance levels, operating at increasingly high speeds, and using increasingly complex cryptographic keys. The trend is towards the manipulation of data elements encoded on 768, 1024, 1536 and even 2048 bits. To process data elements of this size, it may be necessary to construct larger-size circuits by adapting the elements of the circuit to the sizes of the data.

This approach may raise problems in applications such as chip cards, wherein the size of the circuit is physically limited because of differences in mechanical bending stresses between the cards and the silicon substrates. Furthermore, it is becoming increasingly necessary to integrate larger numbers of different functional elements in a card of this kind. The space available for an encryption circuit is thereby correspondingly reduced. Approaches therefore need to be found to limit the increase in the size of this circuit while, at the same time, enabling optimum operation for data elements with a size greater than the size of the initially planned registers.

To carry out modular operations using operands with a size greater than that managed by the coprocessor, it is possible to use the circuit 1 shown in FIG. 2. In practice, the maximum size is equal to the size of the registers. Circuit 1 includes a standard processor 2 (8, 16 or 32 bits), a memory 3, the coprocessor 4 of FIG. 1, and a communications bus 5 used to connect the different elements 2, 3 and 4 together and/or external to the circuit 1. In the circuit of FIG. 2, the coprocessor 4 is used as a multiplier operating on $m*k$ bits, which is conventionally 256 or 512 bits. The processor 2 is used, in particular, to supervise operations to be performed according to a particular encryption algorithm, and the data exchanges between the memory 3 and the coprocessor 4.

Performance of the basic operation of modular computations according to the Montgomery method, known as the $P_{field}$ operation, is based upon three binary data elements. These data elements are A (multiplicand), B (multiplier) and N (modulo), which are encoded on a whole number of n bits. They are used for the production of a binary data referenced as $P(A, B)_N$ encoded on n bits such that $P(A, B)_N = A*B*I$ mod N. I is an error due to the Montgomery method. Should n have a size greater than the size of the registers, namely $m*k$, it is appropriate to subdivide n into p words of Bt bits. Bt is a working base with a size smaller than or equal to $m*k$, e.g., $m*k$. The Montgomery method operates as follows. The variable i is an index varying from 0 to $m-1$, and the following computation loop is repeated:

$X = S_i + A_i * B$, $Y_0 = (X * J_0)$ mod $2^{Bt}$, $Z = X + (N * Y_0)$, $S_{i+1} = Z \backslash 2^{Bt}$, \ is a whole number division, if $S_{i+1}$ is greater than N, then N is subtracted from $S_{i+1}$, $A_i$ corresponds to a word of Bt bits of the breakdown of A, and $S_i$ corresponds to an updated result of the $P_{field}$ operation, and $S_m = P(A, B)_N = A*B*I \bmod N$.

A computation method of this kind requires a larger number of data exchanges between the coprocessors 4 and the memory 3. The coprocessor 4 of FIG. 1 can carry out only simple operations of multiplication such as A*B=S. A and B are encoded on Bt bits and S is encoded on 2*Bt bits. One approach proposed in U.S. Pat. No. 5,987,489 includes the coprocessor 4 performing an operation of the type S=A*B+C, in which A, B and C are encoded on Bt bits, and S is encoded on 2*Bt bits.

FIG. 3 shows a coprocessor 4 according to the referenced U.S. Pat. No. 5,987,489. The coprocessor 4 illustrated in FIG. 3 includes three shift register 110, 111 and 112 with serial a input and a serial output. These registers include a number of n cells, and n=m*k, where n, m and k are integers. A multiplexer 113 includes three serial inputs and one serial output. The serial output is connected to the input of the register 110, the first input is connected to a first input terminal 150, and the second input is connected to the output of the register 110. A multiplexer 114 includes two serial inputs and one serial output. The serial output is connected to the input of the register 111, and the first input is connected to a second input terminal 151. A multiplexer 115 includes three serial inputs and one serial output. The serial output is connected to the input of the register 112, the first input is connected to a third input terminal 152, and the second input is connected to the output of the register 112.

The coprocessor 4 further includes three k-cell registers 116, 117 and 118 each having a serial input and a parallel output. The input of the register 117 is connected to a fourth input terminal 153. Two multiplication circuits 119 and 120 include a serial input, a parallel input to receive k bits, and a serial output. Two registers 121 and 122, for the storage of k cells, include a parallel input and a parallel output. The input of the register 121 is connected to the output of the register 116, the output of the register 121 is connected to the parallel input of the multiplication circuit 119, and the output of the register 122 is connected to the parallel input of the multiplication circuit 120.

A multiplexer 123 includes two parallel inputs and one parallel output. The first input of the multiplexer 123 is connected to the output of the register 117, the second input of the multiplexer 123 being connected to the output of the register 118, the output of the multiplexer 123 is connected to the input of the register 122. Two multiplexers 124 and 125 each include two serial inputs and one serial output. The output of the multiplexer 124 is connected to the input of the register 116, the first input of the multiplexer 124 is connected to a fifth input terminal 154, the output of the multiplexer 125 is connected to the serial input of the multiplication circuit 119, and the first input of the multiplexer 125 is for receiving a logic zero.

A multiplexer 126 includes three serial inputs and one serial output. The output is connected to the serial input of the multiplication circuit 120, and the first input is for receiving a logic zero. Subtraction circuits 127, 128 and 129 each include two serial inputs and one serial output. The first input of the circuit 127 is connected to the output of the register 110, the output of the circuit 127 is connected to each of the second inputs of the multiplexers 124 and 125 and also to an output terminal 155, and the first input of the circuit 128 is connected to the output of the register 111.

An addition circuit 130 includes two serial inputs and one serial output. The first input of the circuit 130 is connected to the output of the circuit 119, and the output of the circuit 130 is connected to the second input of the multiplexer 126.

An addition circuit 131 includes two serial inputs, one serial output and one carry output. The carry output of the circuit 131 is connected to the first input of the circuit 129. Delay cells 132, 133 and 134 delay the propagation of binary data by k cycle times. These cells are typically k bit shift registers. These cells include one serial input and one serial output. The output of the cell 132 is connected firstly to the third input of the multiplexer 126 and secondly to the input of the cell 133. The output of the cell 133 is connected to the second input of the circuit 129. The input of the cell 134 is connected to the output of the circuit 130, and the output of the cell 134 is connected to the first input of the circuit 131.

A comparison circuit 135 includes two serial inputs and two outputs. The first input is connected to the output of the circuit 131, and the second input is connected to the output of the circuit 129. Two multiplexers 136 and 137 each include two serial inputs, one selection input and one serial output. Each of the first inputs are for receiving a logic zero. Each of the selection inputs are connected to one of the outputs of the circuit 135. The output of the multiplexer 136 is connected to the second input of the circuit 127, and the output of the multiplexer 137 is connected to the second input of the circuit 128.

A multiplexer 138 includes two serial inputs and one serial output. The first input is for receiving a logic 1, the second input is connected to the output of the register 112, and the output is connected firstly to the input of the cell 32 and secondly to the second inputs of the multiplexers 136 and 137. A demultiplexer 139 includes one serial input and two serial outputs. The input is connected to the output of the circuit 120, and the outputs are connected respectively to the input of the register 118 and to the second input of the circuit 131. A multiplexer 140 includes two serial inputs and one serial output. The first input is connected to the output of the circuit 128, the second input is for receiving a logic 0, and the output is connected to the second input of the circuit 130. A multiplexer 141 includes two serial inputs and one serial output. The first input is connected to the output of the circuit 130, the second input is connected to the output of the circuit 131, and the output is connected to the third inputs of the multiplexers 113 and 115 and to the second input of the multiplexer 114. Two output terminals 156 and 157 are respectively connected to the outputs of the registers 111 and 112.

FIG. 3 shows a coprocessor 4 according to the referenced U.S. Pat. No. 5,987,489. The coprocessor 4 illustrated in FIG. 3 includes three shift register 110, 111 and 112 with serial a input and a serial output. These registers include a number of n cells, and n=m*k, where n, m and k are integers. A multiplexer 113 includes three serial inputs and one serial output. The serial output is connected to the input of the register 110, the first input is connected to a first input terminal 150, and the second input is connected to the output of the register 110. A multiplexer 114 includes two serial inputs and one serial output. The serial output is connected to the input of the register 111, and the first input is connected to a second input terminal 151. A multiplexer 115 includes three serial inputs and one serial output. The serial output is connected to the input of the register 112, the first input is connected to a third input terminal 152, and the second input is connected to the output of the register 112.

In the referenced U.S. Pat. No. 5,987,489 one alternative variation shows a circuit that enables the performance of the elementary operation S=A*B+C+D, with A, B, C and D encoded on Bt bits and S encoded on 2*Bt bits. An object of this alternative variation is to carry out a multiplication on p*Bt bits, and an addition on p*Bt bits simultaneously to obtain the computation of $X=S_i+A_i{}^*B$ and $Z=X+(N^*Y_0)$ of the Montgomery algorithm at a higher speed.

If the Montgomery algorithm set up by elementary operations of the $S=A^*B+C+D$ type is developed, the following loop repetition is obtained.

A) Computation of $X=S_i+A_i{}^*B$ for providing $X_p \ldots X_0 = S_{i,p-1} \ldots S_{i,0}+A_i{}^*B_{p-1} \ldots B_0$, with $X_j$, $S_{i,j}$ and $B_j$ being the Bt bit words of X, $S_i$ and B. This is a result of the succession of the following p computations made in the coprocessor 4:

A1) $X'_1 X_0 = S_{i,0}+A_i{}^*B_0+0$

A2) $X'_2 X_1 = S_{i,1}+A_i{}^*B_1+X'_1 \ldots$

Ap-1) $X'_{p-1}X_{p-2}=_{Si,p}-2+A_i{}^*B_{p-2}+X'p-2$

Ap) $X_p X_{p-1}=S_{i,p-1}+A_i{}^*B_{p-1}+X'_{p-1}$ $X'_1$ to $X'_{p-1}$ are Bt bit words of intermediate computation that remain permanently in the coprocessor 4.

B) $Y_0 = (X^*J_0) \bmod 2^{Bt}$ for providing $Y_0=(X_p \ldots X_0{}^*J_0) \bmod 2^{Bt}$, by the following computation made in the coprocessor 4: $Y'1Y_0=X_0{}^*J_0+0$. The least significant word $Y_0$ is the only one of interest.

C) $Z=X+N^*Y_0$ for providing $Z_p \ldots Z_0=X_p \ldots X_0+Y_0{}^*N_{p-1} \ldots N_0$. $Z_j$, $X_j$ and $N_j$ are the Bt bit words of Z, X and N using the following succession of p+1 computations made in the coprocessor 4:

C1) $Z'_1 Z_0 = X_0+Y_0{}^*N_0+0$

C2) $Z'_2 Z_1 = X_1+Y_0{}^*N_1+Z'_1 \ldots$

Cp-1) $Z'_{p-1}Z_{p-2}=X_{p-2}+Y_0{}^*N_{p-2}+Z'_{p-2}$

Cp) $Z'_p Z_{p-1}=X_{p-1}+Y_0{}^*N_{p-1}+Z'_{p-1}$

Cp+1) $Z_p = X_p + 0^*0 + Z'_p$ $Z'_1$ to $Z'_p$ are Bt bit words of intermediate computation that remain permanently in the coprocessor 4.

D) $S_{i+1}=Z\backslash 2^{Bt}$, \ is an integer division. If $S_{i+1}$ is greater than N, then N is subtracted from $S_{i+1}$.

SUMMARY OF THE INVENTION

An object of the invention is to improve the computation time by eliminating the computation identified as Cp+1 by creating a new $S=A^*B+C$ type operation, with S and C encoded on 2*Bt bits and A and B encoded on Bt bits. To carry out this new operation, an overflow storage flip-flop circuit has been added to store a possible overflow at the end of an elementary computation and reinsert the overflow, if any, during the next computation.

Another object of the invention is to provide a computation circuit to carry out an operation $A^*B+C$. A and B are integers encoded on at most m*k bits. C is an integer encoded on at most 2*m*k bits, with m and k being non-zero integers. The computation circuit includes first, second and third (m*k) bit registers for storing data. A fourth k bit register stores a data element. A first multiplication circuit carries out operations of multiplication between the data elements of the first and fourth registers. Addition means carry out an addition of the data elements of the second and third registers, and the result is provided by the multiplication circuit. There are means to store a carry value, if any, resulting from an overflow of the addition. Linking means provide an intermediate result provided by the addition means in the second and third registers. The linking provides the carry value stored during a previous addition to the addition means. This is done to add the carry value in the place of the least significant word which is to be added as soon as the least significant word has been added.

According to one approach, the computation circuit comprises a fifth (m*k) bit register to successively provide k bit words to the fourth register.

The invention also provides that the performance of the same elementary operations is obtained by using the two multipliers in parallel to reduce the computation time by two. The computation circuit comprises a second multiplication circuit for the performance, simultaneously with the first multiplication circuit, of the multiplication of the data element of the first register with a data element of a sixth k bit register. The addition means or adder carries out the addition, with a k bit shift, of the result provided by the second multiplication circuit.

The invention also relates to a modular arithmetic coprocessor including implementation of the modular operations on numbers encoded on m*k bits, with m and k being integers, and the previously defined computation circuit. More generally, the invention relates to a modular computation device including a processor, a memory, and the coprocessor disclosed herein.

Furthermore, another object of the invention is to provide a method for the computation of $A^*B+C$. A and B are integers encoded on at most m*k bits. C is an integer encoded on at most 2*m*k bits, with m and k being non-zero integers. In a multiplication circuit, a data element of a first (m*k) bit register is multiplied by a data element of a fourth k bit register. Data elements of a second (m*k) bit register and a third (m*k) bit register are added with the result provided by the multiplication circuit. A carry value, if any, results from an overflow of the addition stored. An intermediate result is stored in the second and third registers. The previous operations are repeated for changing the data element of the fourth register and adding the carry value, if any, stored in the place of the least significant word to be added as soon as the least significant word has been added.

In one embodiment, an operand is stored entirely in a fifth (m*k) bit register to provide the operand successively to the fourth register. To divide the time needed to perform the method by two, a second multiplication is performed in parallel. The result of this multiplication is added with a k bit shift.

More generally, the invention relates to a method for the computation of modular operations on operands of a size greater than m*k bits in which the operands are processed in m*k bit words by using the method of the invention.

BRIEF DESCRIPTION OF THE DRAWINGS

The invention will be understood more clearly and other particular features and advantages shall appear from the following description, made with reference to the appended drawings, of which.

DETAILED DESCRIPTION OF THE PREFERRED EMBODIMENTS

Figure 3:
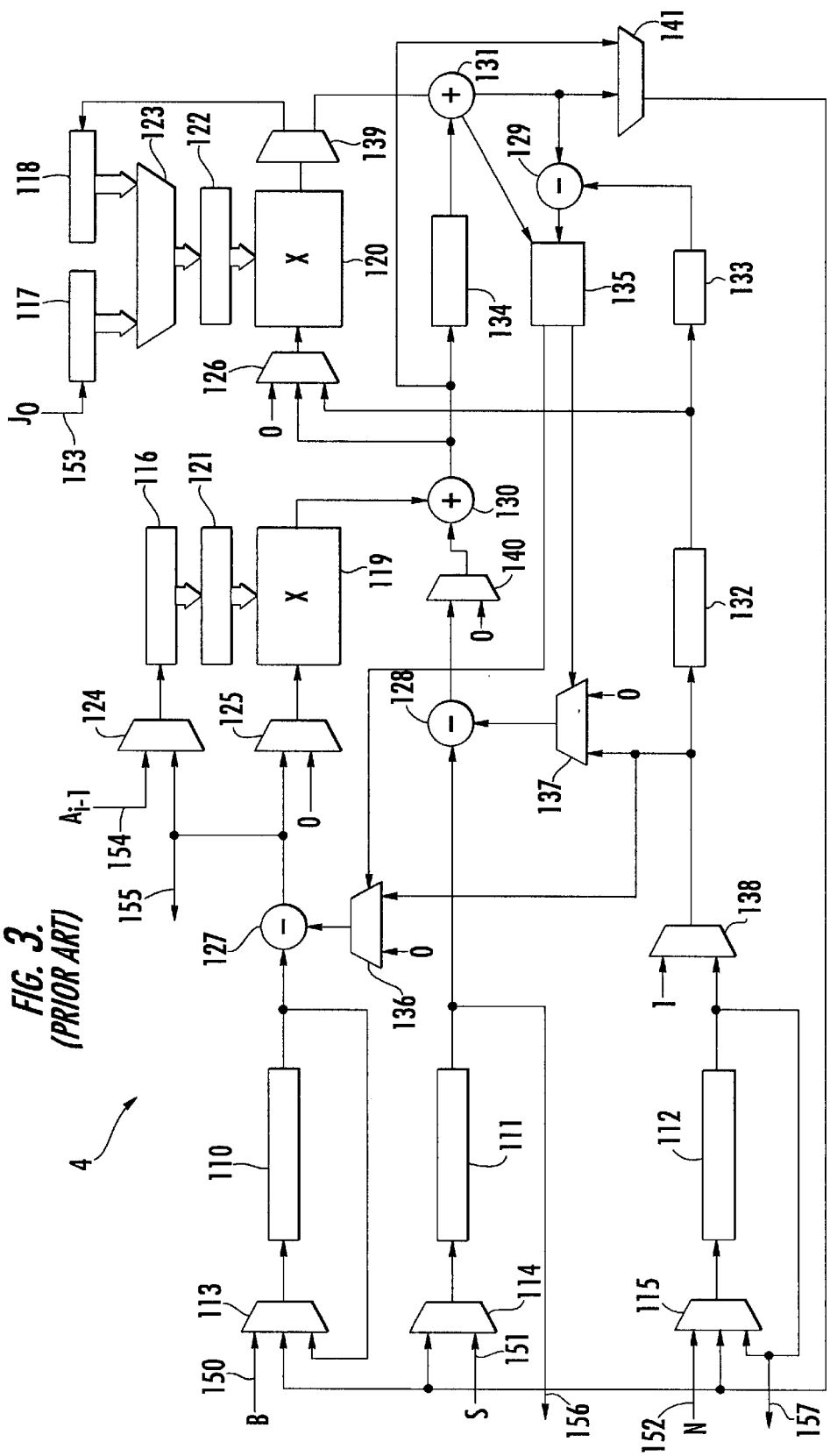
FIG. 3 illustrates a modular coprocessor according to the prior art.
Figure 4:
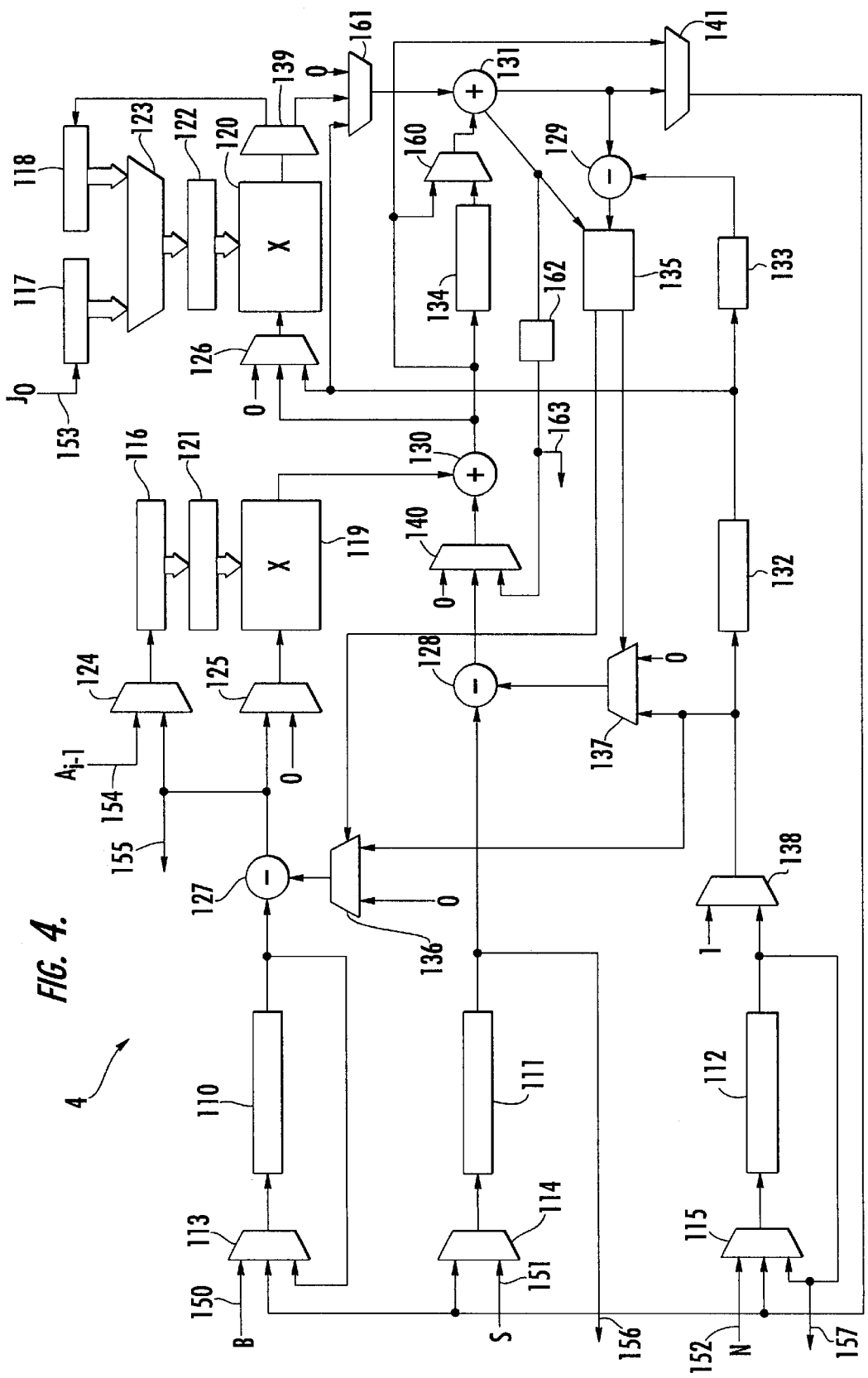
FIGS. 4 and 5 illustrate two embodiments of a modular computation coprocessor, according to the present invention.

FIG. 4 shows the coprocessor 4 of FIG. 3 modified according to the invention. The modifications performed are the following. The delay cell 132 is used as a k bit shift register. The multiplexer 140 comprises a third input. The inputs of the addition circuit 131 are no longer connected to the outputs of the delay cell 134 and the demultiplexer 139. A multiplexer 160 comprising two inputs and one output has been added. The first input of the multiplexer 160 is connected to the output of the circuit 130. The second input of the multiplexer 160 is connected to the output of the delay cell 134, and the output of the multiplexer 160 is connected to the first input of the circuit 131.

The modifications further include adding a multiplexer 161 comprising three inputs and one output. The first input of the multiplexer 161 is connected to the output of the delay cell 132. The second input of the multiplexer 161 is connected to the second output of the demultiplexer 139. The third input of the multiplexer 161 is for receiving a logic 0, and the output of the multiplexer 161 is connected to the second input of the circuit 131. A storage flip-flop circuit 162 comprising an input and an output has been added. The flip-flop circuit is used to store a bit. The input of the flip-flop circuit 162 is connected to the carry output of the circuit 131, and the output of the flip-flop circuit 162 is connected to the third input of the multiplexer 140. An output terminal 163 connected to the output of the flip-flop circuit 162 makes it possible to output the bit contained in the flip-flop circuit.

Figure 1:
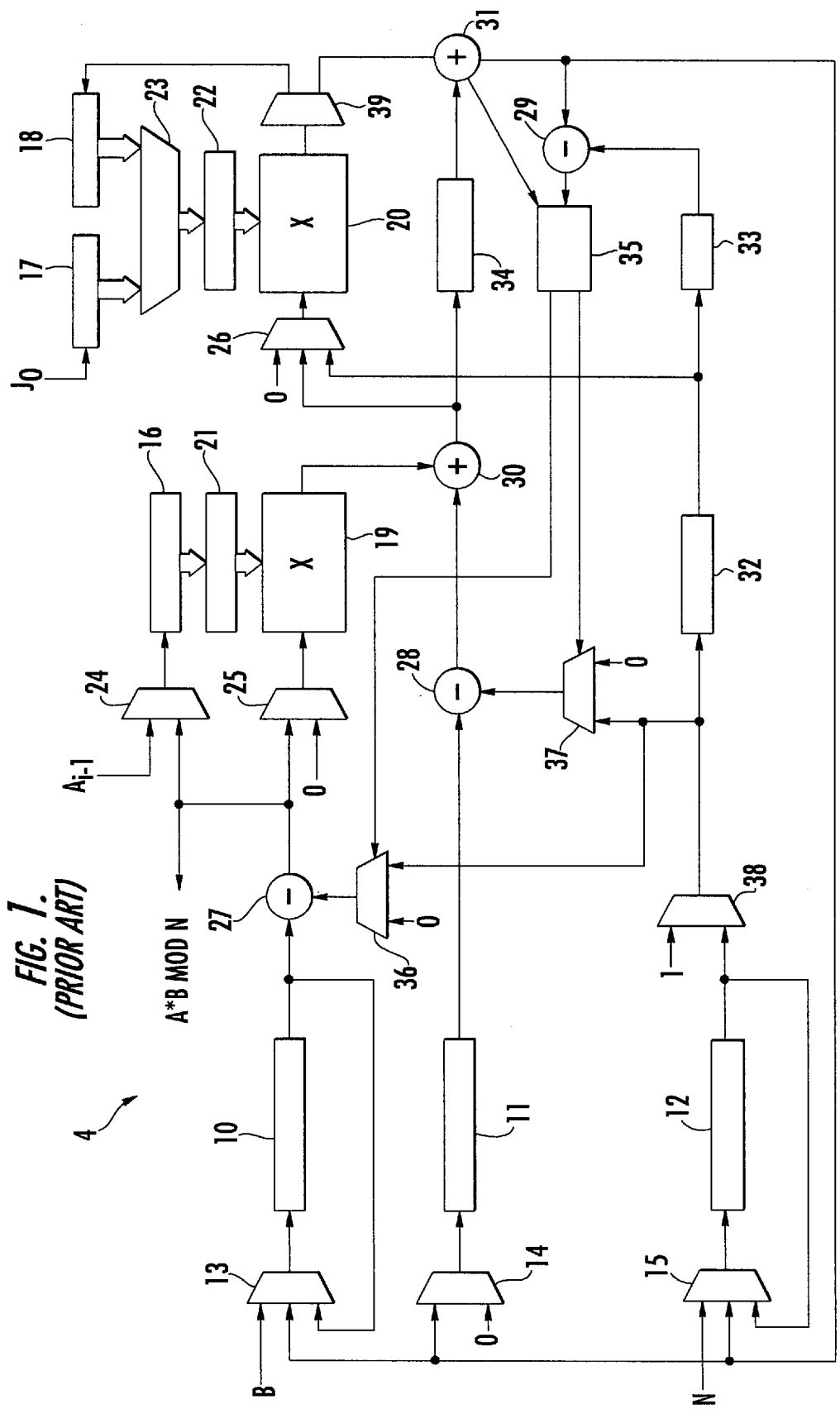
FIG. 1 illustrates a modular coprocessor, according to the prior art.

The different elements forming the coprocessor 4 of FIG. 4 may furthermore be modified to support additional functions. Thus, it is possible to add computation circuits and additional multiplexers to create new processing capacities that allow the setting up of the paths needed for the running of the operation according to the invention. Similarly, if the multiplexers 140, 141, 160 and 161 have their outputs directed respectively to their first and second inputs, the coprocessor 4 of FIG. 1 is formed. To carry out the different functions of the circuit of FIG. 1, reference may be made to U.S. Pat. No. 5,513,133.

To enable the performance of the elementary operation of the invention, i.e., S=A*B+C, it is necessary to neutralize certain elements of the coprocessor 4 of FIG. 4. Thus, the multiplexers 136 and 137 are positioned to provide a 0 at their output so that the circuits 127 and 128 operate functionally as wires. The multiplexer 160 is positioned to permanently connect the output of the circuit 130 to the first input of the circuit 131.

For reasons of clarity, no account will be taken of the delays caused by the subtraction and addition circuits 127, 128, 130 and 131, or of any delays caused by the initialization of the different elements of the coprocessor 4. Indeed, those skilled in the art are capable of synchronizing the circuits with one another. The following explanations enable the necessary stringing of the different elements of the coprocessor 4 to carry out the elementary operation of the invention, i.e., S=A*B+C. A and B are encoded on Bt=m*k bits, with C and S being encoded on 2*Bt=2*m*k bits.

Initialization: I0) By means of the register 116, the least significant k-bit word $A_0$ of the operand A is loaded into register 121. The m*k bits of the operand B are loaded into the register 110. The m*k least significant bits of the operand C, referenced $C_0$, are loaded into the register 111. The m*k most significant bits of the operand C, referenced $C_1$, are loaded into the register 112. The register 132 and the circuits 130 and 131 are initialized at 0. If it is a first elementary operation, then the flip-flop circuit 162 is initialized at 0.

First iteration: I1) A k bit shift is made in the registers 110, 111, 112 and 132. The data provided by the register 110 is multiplied by the contents of the register 121 using the circuit 119, and the register 110 has its input connected to its output. The data elements provided by the register 111 are added with the result provided by the circuit 119 using the circuit 130. The data elements provided by the register 112 are loaded into the register 132. The data elements entering the register 112 are provided by the output of the circuit 130.

I2) A (m−1)*k bit shift is made in the registers 110 and 111. The data elements provided by the register 110 are multiplied by the contents of the register 121 using the circuit 119. The register 110 has its input connected to its output. The data elements provided by the register 111 are added with the result provided by the circuit 119 using the circuit 130. The data elements entering the register 111 are provided by the output of the circuit 130.

I3) A 1 bit shift is made in the registers 111 and 132. A 0 is sent to the circuit 119. The bit present in the flip-flop circuit 162 is added with the result provided by the circuit 119 using the circuit 130. The bit provided by the register 132 is added to the result provided by the circuit 130 using the circuit 131. The data elements entering the register 111 are provided by the output of the circuit 131.

I4) A k−1 bit shift is made in the registers 111 and 132, 0s are sent to the circuit 119, and 0s are added with the result provided by the circuit 119 using the circuit 130. The bits provided by the register 132 are added to the result provided by the circuit 130 using the circuit 131. The data elements entering the register 111 are provided by the output of the circuit 131. During the last shift, the carry value present in the circuit 131 is stored in the flip-flop circuit 162.

I5) While the steps I1 to I4 are performed, the word $A_1$ is loaded into the register 116.

At the end of the first iteration, the register 110 contains the operand B. The register 111 contains an intermediate result that corresponds to the m*k most significant bits of the operation $A_0*B+C_{1,0}C_0$. $A_0$ corresponds to the k least significant bits of A, $C_{1,0}$ corresponds to the k least significant bits of the most significant (k*m) bit word $C_1$ of the operand C. $C_0$ corresponds to the least significant m*k bit word of the operand C. The register 112 contains, in terms of most significant bits, the word $S_{0,0}$, and in terms of least significant bits, the words $C_{1,m-1}$ to $C_{1,1}$. The word $S_{0,0}$ corresponds to the k least significant bits of the m*k bit word $S_0$ of the result S of the elementary operation of the invention. The words $C_{1,m-1}$ to $C_{1,1}$ correspond to the m−1 most significant k bit words of the most significant m*k bit word $C_1$ of the operand C. The register 116 contains the word A1 corresponding to the k bit word having the significance of 1 in the operand A. The flip-flop circuit 162 contains a possible overflow carry value resulting from the iteration.

Computation loop: The loop initialization and the loop iteration that follow are repeated m−1 times, with j being an index varying form 1 to m−1.

Loop initialization: I'0) The word $A_j$ contained in the register 116 is loaded into the register 121. The register 132 and the circuits 130 and 131 are initialized at 0.

Loop iteration: The steps I1 to I4 defined above are performed.

I'5) While the steps I1 to I4 are being performed, the word $A_{j+1}$ is loaded into the register 116.

At the end of each loop iteration, the register 110 contains the operand B. The register 111 contains an intermediate result that corresponds to the m*k most significant bits of the operation $A_j \ldots A_0*B+C_{1,j} \ldots C_{1,0}C_0 \ldots A_j \ldots A_0$ correspond to the j*k least significant bits of A. $C_{1,j} \ldots C_{1,0}$ correspond to j*k least significant bits of the most significant k*m bit word of the operand C. $C_0$ corresponds to the least significant m*k bit word of the operand C. The register 112 contains, in terms of most significant bits, the words $S_{0,j}$ to $S_{0,0}$ and, in terms of least significant bits, the words $C_{1,m-1}$ to $C_{1,j+1}$. The words $S_{0,j}$ to $S_{0,0}$ correspond to the j*k least significant bits of the m*k bit word $S_0$ of the result S of the elementary operation of the invention. The words $C_{1,m-1}$ to $C_{1,j+1}$ correspond to the m−1−j most significant k bit words of the most significant m*k bit word $C_1$ of the operand C. The register 116 contains the word $A_{j+1}$ corresponding to the k bit word having the significance of j+1 in the operand A. The flip-flop circuit 162 contains a possible overflow carry value resulting from the previous iteration.

At the end of the last iteration, the result S is contained in the registers 111 and 112. A possible carry value is stored in the flip-flop circuit 162. To recover the total result, the data elements contained in the registers 111 and 112 are output by means of the terminals 156 and 157, and a carry value indicating an overflow of computation, if any, is recovered by the terminal 163.

If, on the contrary, it is desired to chain a computation, only the contents of the register 112 are output. To perform the chaining of a computation, a word with Bt=m*k more significant bits of the variable to be added is loaded into the register 112. Then, the more significant word replacing A is presented. The updating of the flip-flop circuit 162 is not performed.

Figure 2:
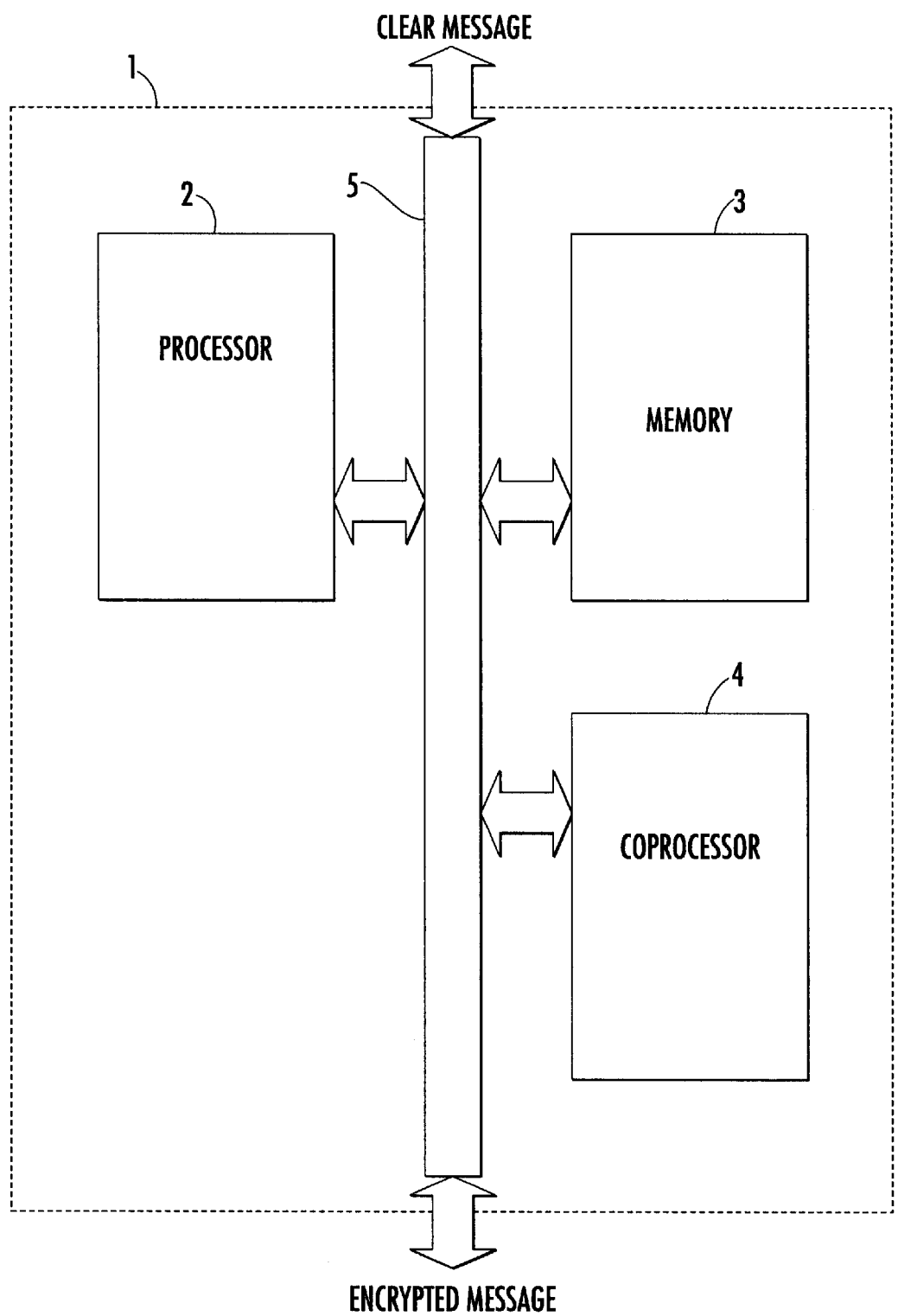
FIG. 2 illustrates a modular computation device, according to the prior art.

By way of an example, the performance of an operation $P_{field}(D, E)N=S$ is illustrated with the circuit 1 of FIG. 2 using the coprocessor 4 of FIG. 4. D, E, S and N are encoded on p words of Bt bits, with Bt being equal to m*k bits. The operation takes place as follows. The computation loop formed by the succession of following steps is repeated p times. The variable i is an index varying from 0 to p−1, and is incremented for each performance of the loop by the processor 2.

PX) Computation of $X=S_i+D_i*E$. $X_p \ldots X_0=S_{i,p-1} \ldots S_{i,0}+D_i*E_{p-1} \ldots E_0$, with $X_j$, $S_{i,j}$ and $E_j$ being the Bt bit words of X, $S_i$ and B. $S_i$ is an updated value of S such that $S_0=0$ and $S_{p-1}=S$ in breaking down the computation by the steps PX1 to PXp.

PX1) $X'_1X_0=S_{i,1}S_{i,0}+D_i*E_0$ loads $D_i$ into the register 110, $S_{i,1}$ into the register 112, and $S_{i,0}$ into the register 111 for initializing the flip-flop circuit 162 at 0. The m words of k bits forming $E_0$ are successively loaded into the register 116. At the end of the computation, the contents of the register 112 corresponding to $X_0$ are output.

PX2) $X'_2X_1=S_{i,2}X'_1+D_i*E_1$ loads $S_{i,2}$ into the register 112, $S_{i,1}$ into the register 112, and successively loads the m words of k bits forming $E_1$ in the register 116. At the end of the computation, the contents of the register 112 corresponding to $X_1$ are output.

Pxp−1) $X'_{p-1}X_{p-2}=S_{i,p-1}X'_{p-2}+D_i*E_{p-2}$ loads $S_{i,p-1}$ into the register 112, and successively loads the m words of k bits forming $E_{p-2}$ in the register 116. At the end of the computation, the contents of the register 112 corresponding to $X_{p-2}$ are output.

Pxp) $X_pX_{p-1}=X'_{p-1}+D_i*E_{p-1}$ loads 0s into the register 112, and successively loads the m words of k bits forming $E_{p-1}$ in the register 116. At the end of the computation, the contents of the register 112, which correspond to $X_{p-1}$, and the contents of the register 111, which correspond to Xp, are output. The output of the carry value is unnecessary because it is 0. $X'_1$ to $X'_{p-1}$ are Bt bit words of intermediate computation that remain in the register 111 of the coprocessor 4 between two computations PY) $Y_0=(X*J_0) \bmod 2^{Bt}$. $Y_0=(X_p \ldots X_0*J_0) \bmod 2^{Bt}$, by the following computation made in the coprocessor 4.

$Y'_1Y_0=X_0*J_0+0$ loads $X_0$ into the register 110, and 0s into the registers 111 and 112. The flip-flop circuit 162 is initialized at 0 and successively loads the m words of k bits forming $J_0$ into the register 116. At the end of the computation, the contents of the register 112 corresponding to $Y_0$, which are the only data element of interest, are output.

PZ) $Z=X+N*Y_0$. $Z_p \ldots Z_0=X_p \ldots X_0+Y_0*N_{p-1} \ldots N_0$, with $Z_j$, $X_j$ and $N_j$ being the Bt bit words of Z, X and N. The computation is broken down by the steps PZ1 to PZp.

PZ1) $Z'_1Z_0=X_1X_0+Y_0*N_0$ loads $Y_0$ into the register 110, $X_1$ into the register 112, and $X_0$ into the register 111. The flip-flop circuit 162 is initialized at 0 and successively loads the m words of k bits forming $N_0$ into the register 116. At the end of the computation, the contents of the register 112 that correspond to $Z_0$ are output.

PZ2) $Z'_2Z_1=X_2Z'_1+Y_0*N_1$ loads $X_2$ into the register 112, and successively loads the m words of k bits forming $N_1$ in the register 116. At the end of the computation, the contents of the register 112, which correspond to $Z_1$, are output.

Pzp−1) $Z'_{p-1}Z_{p-2}=X_{p-1}Z'_{p-2}+Y_0*N_{p-2}$ loads $X_{p-1}$ into the register 112, and successively loads the m words of k bits forming $N_{p-2}$ in the register 116. At the end of the computation, the contents of the register 112, which correspond to $Z_{p-2}$, are output.

Pzp) $Z_pZ_{p-1}=X_pZ'_{p-1}+Y_0*N_{p-1}$ loads $X_p$ values into the register 112 and successively loads the m words of k bits forming $N_{p-1}$ in the register 116. At the end of the computation, the contents of the register 112 corresponding to $Z_{p-1}$, and the contents of the register 111 corresponding to $Z_p$ are output. The carry value is also output. $Z'_1$ to $Z'_p$ are Bt bit words of intermediate computation that remain permanently in the coprocessor 4.

PS) If the carry value is equal to 0 and if $Z\backslash 2^{Bt}$ is smaller than N, then $S_{i+1}=Z\backslash 2^{Bt}$. Otherwise, $S_{i+1}=Z\backslash 2^{Bt}-N$, with \ being an integer division.

In the example described above, the invention enables economizing of the p addition of Bt bits, i.e., about p*Bt cycles of the clock signal used for the stringing of the coprocessor 4. This makes it possible to prevent exchanges of data between the memory 3 and the coprocessor 4. It will be noted that the operation S=A*B+C is performed with a variable C reconstructed from words of smaller size whose source is different.

Alternative embodiments of the processor 4 of FIG. 4 are possible. It is not necessary to connect the output of the flip-flop circuit 162 to the multiplexer 140 and to the terminal 163. It is possible, for example, to connect the output of the flip-flop circuit 162 to the control device of the processor 4 (not shown), and connect a third input of the multiplexer to a logic 1. The control device provides either a 0 or 1 as a function of the bit contained in the flip-flop circuit. An overflow indicator controlled by the control device, e.g., a status register, is always capable of being provided to the rest of the circuit 1. Similarly, the multiplexer 161 is not necessary, but is used to simplify the stringing of the coprocessor 4. It is possible to load the number 1 into the register 122 to use the multiplication circuit 120 as a wire. Sending a logic 0 is done by the multiplexer 126. It is also possible to modify the arrangement of the different elements used to perform the computation described in detail above with reference to the different components of the coprocessor 4 used to perform other functions.

Figure 5:
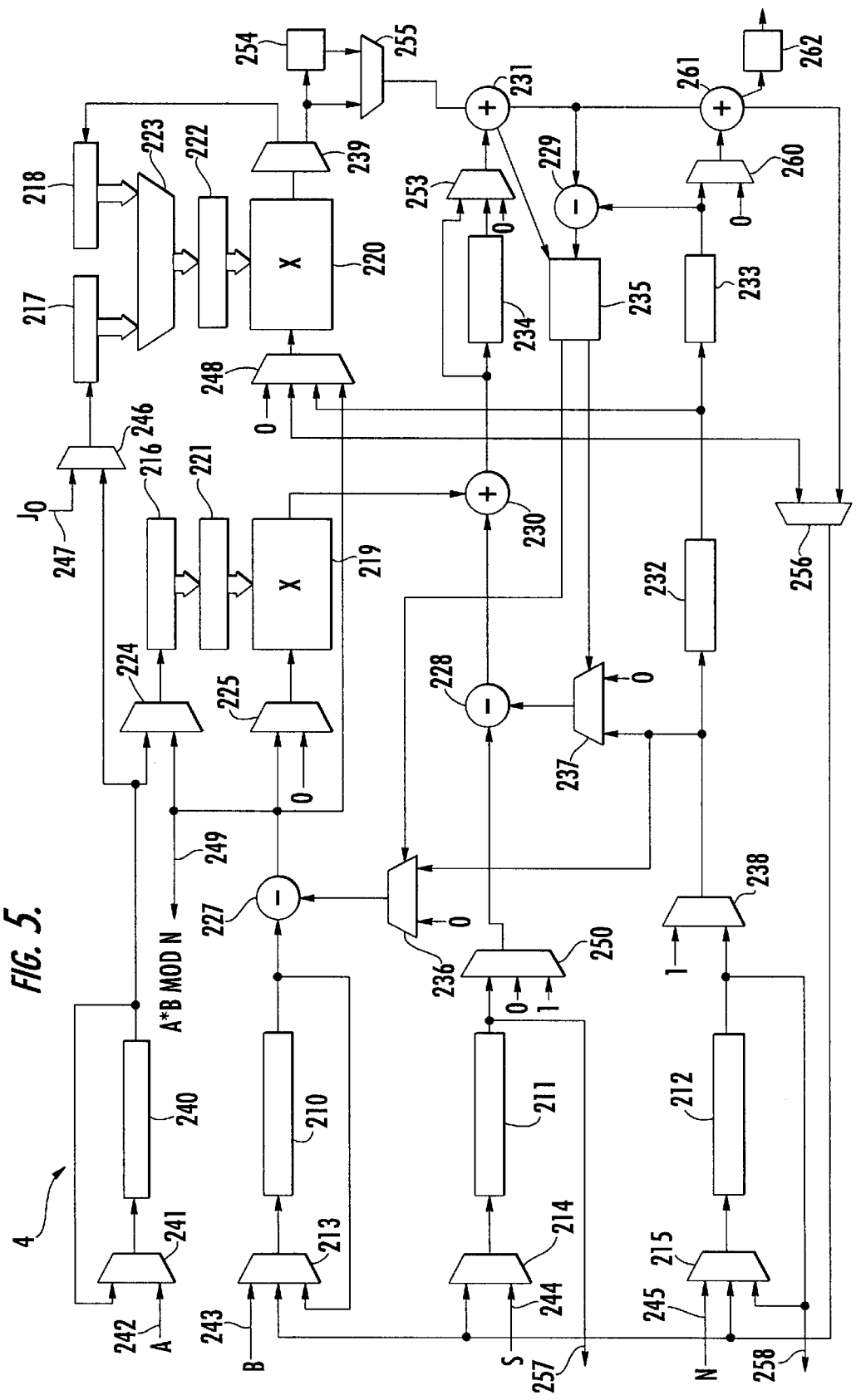

FIG. 5 shows an alternative embodiment of the invention. The coprocessor 4 of FIG. 5 comprises four shift registers 210, 211, 212 and 240 with a serial input and a serial output.

These registers comprise n number of cells, with n=m*k, and n, m and k being integers. A multiplexer 241 comprises two serial inputs and one serial output. The serial output of the multiplexer 241 is connected to the input of the register 240. A first input of the multiplexer 241 is connected to a first terminal 242, and a second input of the multiplexer 241 is connected to the output of the register 240. A multiplexer 213 comprises three serial inputs and one serial output. The serial output of the multiplexer 213 is connected to the input of the register 210. A first input of the multiplexer 213 is connected to a second input terminal 243, and a second input of the multiplexer 213 is connected to the output of the register 210.

The coprocessor 4 further includes a multiplexer 214 comprising two serial inputs and one serial output. The serial output of the multiplexer 214 is connected to the input of the register 211, and a first input of the multiplexer 214 is connected to a third input terminal 244. A multiplexer 215 comprises three serial inputs and one serial output. The serial output of the multiplexer 215 is connected to the input of the register 212. A first input of the multiplexer 215 is connected to a fourth input terminal 245, and a second input of the multiplexer 215 is connected to the output of the register 212. Three k cell registers 216, 217 and 218 comprises one serial input and one parallel output.

A multiplexer 246 comprises two serial inputs and one serial output. The serial output of the multiplexer 246 is connected to the input of the register 217. A first input of the multiplexer 246 is connected to a fifth input terminal 247, and a second input of the multiplexer 246 is connected to the output of the register 240. Two multiplication circuits 219 and 220 comprises one serial input, one parallel input to receive k bits, and one serial output. Two k cell storage registers 221 and 222 comprises one parallel input and one parallel output. The input of the register 221 is connected to the output of the register 216. The output of the register 221 is connected to the parallel input of the multiplication circuit 219, and the output of the register 222 is connected to the parallel input of the multiplication circuit 220.

A multiplexer 223 comprises two parallel inputs and one parallel output. A first input of the multiplexer 223 is connected to the output of the register 216, and a second input of the multiplexer 223 is connected to the output of the register 218. The output of the multiplexer 223 is connected to the input of the register 222. Two multiplexers 224 and 225 each comprises two serial inputs and one serial output. The output of the multiplexer 224 is connected to the input of the register 216. A first input of the multiplexer 224 is connected to the output of the register 240. The output of the multiplexer 225 is connected to the serial input of the multiplication circuit 219, and a first input of the multiplexer 225 is for receiving a logic 0.

A multiplexer 248 comprises four series inputs and one series output. The output of the multiplexer 248 is connected to the series input of the multiplication circuit 220, and a first input of this multiplexer is for receiving a logic 0. Subtraction circuits 227, 228 and 229 each comprise two serial inputs and one serial output. A first input of the circuit 227 is connected to the output of the register 210. The output of the circuit 227 is connected to each of the two inputs of the multiplexers 224 and 225, to an output terminal 249, and to a fourth input of the multiplexer 248. A multiplexer 250 comprises three serial inputs and one serial output. The output of the multiplexer 250 is connected to the first input of the circuit 228. A first input of the multiplexer 250 is connected to the output of the register 211. A second input of this multiplexer is for receiving a logic 0, and a third input of this multiplexer is for receiving a logic 1.

Two addition circuits 230 and 231 each comprises two serial inputs and one serial output. A first input of the circuit 230 is connected to the output of the circuit 219, and a second input of this circuit is connected to the output of the subtraction circuit 228. The output of the circuit 230 is connected to a second input of the multiplexer 248. The output of the circuit 231 is connected to a first input of the circuit 229. A multiplexer 253 comprises three serial inputs and one serial output. The serial output of the multiplexer 253 is connected to a first input of the addition circuit 231, and a first input of this multiplexer is connected to the output of the addition circuit 230. The third input of the multiplexer is for receiving a logic 0.

Delay cells 232, 233 and 234 delay the propagation of binary data by k cycle periods. These cells are typically k bit shift registers having the size of the registers 216, 217 and 218. These cells each comprise a serial input and a serial output. The output of the cell 232 is connected firstly to a third input of the multiplexer 248, and secondly to the input of the cell 233. The output of the cell 233 is connected to a second input of the circuit 229. The input of the cell 234 is connected to the output of the addition circuit 230, and the output of the cell 234 is connected to a second input of the multiplexer 253. A comparison circuit 235 comprises two serial inputs and two outputs. A first input of the circuit 235 is connected to the output of the circuit 231, and a second input of the circuit 235 is connected to the output of the circuit 229.

Two multiplexers 236 and 237 each comprises two serial inputs, one selection input, and one serial output. Each of the first serial inputs of the multiplexers 236 and 237 are for receiving a logic 0. Each of the selection inputs are connected to one of the outputs of the circuit 235. The output of the multiplexer 236 is connected to a second input of the circuit 227, and the output of the multiplexer 237 is connected to a second input of the circuit 228. A multiplexer 238 comprises two serial inputs and one serial output. A first input of the multiplexer 238 is for receiving a logic 1. A second input of the multiplexer 238 is connected to the output of the register 212. The output of the multiplexer 238 is connected firstly to the input of the cell 232, and secondly to the second inputs of the multiplexers 236 and 237.

A demultiplexer 239 comprises a serial input and two serial outputs. The input of the demultiplexer 239 is connected to the output of the circuit 220, and a first output of the demultiplexer 239 is connected to the input of the register 218. A delay cell 254 delays the propagation of the binary data elements by k cycle times. These cells are typically k bit shift registers. This cell comprises a serial input and a serial output. The input of the cell 254 is connected to a second output of the demultiplexer 239. A multiplexer 255 comprises two serial inputs and one serial output. A first input of the multiplexer 255 is connected to the second output of the demultiplexer 239. A second input of the multiplexer 255 is connected to the output of the cell 254, and the output of the multiplexer 255 is connected to a second input of the addition circuit 231.

A multiplexer 256 comprises two serial inputs and one serial output. A first input of the multiplexer 256 is connected to the output of the addition circuit 230. The output of this multiplexer is connected to the third inputs of the multiplexers 213 and 215 and to a second input of the multiplexer 214. Two output terminals 257 and 258 are connected respectively to the outputs of the registers 211 and 212. A multiplexer 260 comprises two serial inputs and one serial output. A first input of the multiplexer 260 is connected to the output of the delay cell 233, and a second input is for receiving a logic 0. An addition circuit 261 comprises two serial inputs, one computation output, and one carry output. A first input of the addition circuit 261 is connected to the output of the multiplexer 260. A second input of the addition circuit 261 is connected to the output of the addition circuit 231. The computation output of the addition circuit 261 is connected to the second input of the multiplexer 256.

A storage flip-flop circuit 262 comprises one input and one output. The input is connected to the carry output of the addition circuit 261, and the output of the flip-flop circuit 262 is connected to a device for controlling of the coprocessor 4 (not shown). The delay function of the delay cells 232 and 233 is used to perform modular computations internally, as explained in the referenced U.S. Pat. No. 5,513,133. In the invention, the delay cells 232 and 233 are used as shift registers and shall hereinafter be called registers 232 and 233.

As shall be discussed below, this exemplary coprocessor 4 made according to the invention could undergo modifications without going beyond the scope of the invention. With regard to the output and input terminals, it is possible to make use of distinct terminals, but they could also be one or more input/output terminals common to several elements of the coprocessor. One advantage of using distinct terminals is that it is possible to receive and/or provide data elements from and/or to elements external to the coprocessor, such as the processor 2. This reduces the duration of the exchanges between the circuit and the external elements. To perform the operation S=A*B+C, it is necessary to make the subtraction circuits 227 and 228 transparent to the bits received at their first inputs. The second input of the multiplexer 255 is selected permanently so that the data elements produced by the multiplication circuit 220 are provided with a delay of k clock cycles to the addition circuit 231.

In the following explanations, no account will be taken for the delays caused by the subtraction and addition circuits 227, 228, 230 and 231 and 261, or of any delays caused by the initialization of the different elements of the coprocessor 4. Those skilled in the art are capable of synchronizing the circuits with one another. The following explanations enable the necessary stringing of the different elements of the coprocessor 4 to carry out the elementary operation of the invention S=A*B+C. A and B are encoded on Bt=m*k bits, with C and S being encoded on 2*Bt=2*m*k bits, and m is an even number.

Initialization: IT0) The m*k bits of the operand A are loaded into the register 240. $A_0$ and $A_1$ are respectively loaded into the registers 221 and 222 through the registers 216 and 217. $A_0$ and $A_1$ are the k bit words with values 0 and 1 of the operand A. The m*k bits of the operand B are loaded into the register 210. The m*k least significant bits of the operand C, referenced $C_0$, are loaded into the register 211. The m*k most significant bits of the operand C, referenced $C_1$, are loaded into the register 212. The registers 232 and 233, the delay cell 254, the addition circuits 230, 231 and 261, and the multiplication circuits 219 and 220 are initialized at 0. If it is a first elementary operation, then the flip-flop circuit 262 is initialized at 0.

First iteration: IT1) A 2*k bit shift is made in the registers 210, 211, 212 and 232. The data provided by the register 210 is multiplied by the contents of the register 221 using the circuit 219, and by the contents of the register 222 using the circuit 220. The register 210 has its input connected to its output. The data elements provided by the register 211 are added up with the result provided by the circuit 219 using the circuit 230, and with the result provided by the circuit 220 with a k bit shift using the circuit 231. The data elements provided by the register 212 are loaded into the registers 232 and 233. The data elements entering the register 212 are provided by the output of the circuit 231. The circuit 261 is made transparent by the sending of logic 0s through the multiplexer 260.

IT2) A (m−2)*k bit shift is made in the registers 210 and 211. The data elements provided by the register 210 are multiplied by the contents of the register 221 using the circuit 219, and by the contents of the register 222 using the circuit 220. The register 210 has its input connected to its output. The data elements provided by the register 211 are added with the result provided by the circuit 219 using the circuit 230, and with the result provided by the circuit 220 with a k bit shift using the circuit 231. The data elements entering the register 211 are provided by the output of the circuit 231. The circuit 261 is made transparent by sending logic 0s through the multiplexer 260.

IT3) A 1 bit shift is made in the registers 211, 232 and 233. A 0 is sent to the circuits 219 and 220 by the multiplexers 225 and 248. The bit present in the flip-flop circuit 262 is added with the result provided by the circuit 219 using the circuit 230. This is done by the sending either a 0 or a 1 by the multiplexer 250 as a function of the state of the contents of the flip-flop circuit 262. The result provided by the circuit 230 is added with the result provided by the circuit 220 using the circuit 231. The bit provided by the register 233 is added to the result provided by the circuit 231 using the circuit 261. The data elements entering the register 211 are provided by the output of the circuit 261.

IT4) A 2*k−1 bit shift is made in the registers 211, 232 and 233, 0s are sent to the circuits 219 and 220 by the multiplexers 225 and 248, and 0s are added with the result provided by the circuit 219 using the circuit 230. The result provided by the circuit 230 are added with the result provided by the circuit 220 using the circuit 231. The bits provided by the register 233 are added to the result provided by the circuit 231 using the circuit 261. The data elements entering the register 211 are provided by the output of the circuit 261. During the last shift, the carry value present in the circuit 261 is stored in the flip-flop circuit 262.

IT5) While the steps IT1 to IT4 are performed, the words $A_2$ and $A_3$ respectively are loaded into the registers 216 and 217.

At the end of the first iteration, the register 210 contains the operand B. The register 211 contains an intermediate result that corresponds to the m*k most significant bits of the operation $A_0*B+C_{1,1}C_{1,0}C_0$. $A_0$ corresponds to the k least significant bits of A. $C_{1,1}C_{1,0}$ corresponds to the two least significant k bit words of the most significant k*m bit word $C_1$ of the operand C. $C_0$ corresponds to the least significant (m*k) bit word of the operand C. The register 212 contains, in terms of most significant bits, the words $S_{0,1}$ $S_{0,0}$ and, in terms of least significant bits, the words $C_{1,m-1}$ to $C_{1,1}$. The words $S_{0,0}$ and $S_{0,1}$ correspond to the two least significant k-bit words of the (m*k) bit word $S_0$ of the result S of the elementary operation of the invention. The words $C_{1,m-1}$ to $C_{1,2}$ correspond to the m−2 most significant k bit words of the most significant (m*k) bit word $C_1$ of the operand C. The registers 216 and 217 contain the words $A_2$ and $A_3$ corresponding to the k bit word having the values 2 and 3 of the operand A. The flip-flop circuit 262 contains any overflow carry value resulting from the iteration.

Computation loop: The loop initialization and the loop iteration that follow are repeated (m/2)−1 times, with j being an index varying from 1 to (m/2)−1.

Loop initialization: IT'0) The word $A_{2*j}$ contained in the register 216 is loaded into the register 221. The word $A_{2*j+1}$ contained in the register 217 is loaded into the register 222. The registers 232 and 233 and the circuits 230, 231 and 261 are initialized at 0.

Loop iteration: The steps IT1 to IT4 defined above are performed. IT'5) While the steps IT1 to IT4 are being performed, the word $A_{2*j+2}$ is loaded into the register 216, and the word $A_{2*j+3}$ is loaded into the register 217.

At the end of each loop iteration, the register 210 contains the operand B. The register 211 contains an intermediate result that corresponds to the m*k most significant bits of the operation $A_{2*j+1} \ldots A_0{}^*B + C_{1,2*j+1} \ldots C_{1,0}C_0$. $A_{2*j+1} \ldots A_0$ corresponds to the $(2*j+1)*k$ least significant bits of A. $C_{1,2*j+1} \ldots C_{1,0}$ corresponds to $(2*j+2)*k$ least significant bits of the most significant k*m bit word of the operand C. $C_0$ corresponds to the least significant m*k bit word of the operand C. The register 212 contains, in terms of most significant bits, the words $S_{0,2*j+1}$ to $S_{0,0}$ and, in terms of least significant bits, the words $C_{1,m-1}$ to $C_{1,2*j+2}$. The words $S_{0,j}$ to $S_{0,0}$ correspond to the j*k least significant bits of the m*k bit word $S_0$ of the result S of the elementary operation of the invention. The words $C_{1,m-1}$ to $C_{1,2*j+2}$ correspond to the m-2-2*j most significant k bit words of the most significant m*k bit word $C_1$ of the operand C. The registers 216 and 217 contain the words $A_{2*j+2}$ and $A_{2*j+3}$ corresponding to the k bit words having the significance of 2*j+2 and 2*j+3 of the operand A. The flip-flop circuit 262 contains a overflow carry value, if any, resulting from the iteration.

At the end of the last iteration, the result S is contained in the registers 211 and 212. A possible carry value is stored in the flip-flop circuit 262. To recover the total result, the data elements contained in the registers 211 and 212 are output by the terminals 257 and 258 and the carry value, if any, indicating an overflow of computation, is recovered. If it is desired to chain a computation, only the contents of the register 212 are output. To perform the chaining of a computation, a word with Bt=m*k more significant bits of the variable to be added is loaded into the register 112. Then, the more significant word replacing A is loaded into the register 240. The updating of the flip-flop circuit 262 is not performed. If the operands are encoded on a number m of k bit words, with m as an odd number, then the operation returns to the case where m is an even number in adding a word formed by k 0s.

By way of an example, the performance of an operation $P_{field}(D, E)N=S$ is obtained with the circuit 1 of FIG. 2 using the processor 4 of FIG. 4. D, E, S and N are encoded on p words of Bt bits, with Bt being equal to m*k bits. The performance takes place as follows. The computation loop formed by the succession of following steps is repeated p times, with i being an index varying from 0 to p−1 and being incremented for each performance of the loop by the processor 2.

PX) Computation of $X=S_i+D_i{}^*E$. $X_p \ldots X_0 = S_{i,p-1} \ldots S_{i,0} + D_i{}^*E_{p-1} \ldots E_0$, with $X_j$, $S_{i,j}$ and $E_j$ being the Bt bit words of X, $S_i$ and B. $S_i$ is an updated value of S such that $S_0=0$ and $S_{p-1}=S$ breaks down the computation by the steps PX1 to PXp.

PX1) $X'_1X_0=S_{i,1}S_{i,0}+D_i{}^*E_0$ loads $D_i$ into the register 210, $S_{i,1}$ into the register 212, and $S_{i,0}$ into the register 211. The flip-flop circuit 262 is initialized at 0 and $E_0$ is loaded into the register 240. At the end of the computation, the contents of the register 212 corresponding to $X_0$ are provided at an output.

PX2) $X'_2X_1=S_{i,2}X'_1+D_i{}^*E_1$ loads $S_{i,2}$ into the register 212, and $E_1$ is loaded into the register 240. At the end of the computation, the contents of the register 212 corresponding to $X_1$ are provided at an output.

Pxp-1) $X'_{p-1} X_{p-2}=S_{i,p-1} X'_{p-2}+D_i{}^*E_{p-2}$ loads $S_{i,p-1}$ into the register 212, and $E_{p-2}$ is loaded into the register 240. At the end of the computation, the contents of the register 212 corresponding to $X_{p-2}$ are provided at an output.

Pxp) $X_pX_{p-1}=X'_{p-1}+D_i{}^*E_p$ loads 0s into the register 212, and $E_{p-1}$ is loaded into the register 240. At the end of the computation, the contents of the register 212 which correspond to $X_{p-1}$, and the contents of the register 211 which correspond to $X_p$ are provided at an output. The output of the carry value is unnecessary because it is 0. $X'_1$ to $X'_{p-1}$ are Bt bit words of intermediate computation that remain in the register 211 of the coprocessor 4 between two computations.

PY) $Y_0=(X^*J_0) \bmod 2^{Bt}$. $Y_0=(X_p \ldots X_0{}^*J_0) \bmod 2^{Bt}$ is provided by the following computation made in the coprocessor 4. $Y'_1Y_0=X_0{}^*J_0+0$ loads $X_0$ into the register 210, and 0s into the registers 211 and 212. The flip-flop circuit 262 is initialized at 0 and $J_0$ is loaded into the register 240. At the end of the computation, the contents of the register 212 corresponding to $Y_0$, which are the only data elements of interest, are provided at an output.

PZ) $Z=X+N^*Y_0$. $Z_p \ldots Z_0=X_p \ldots X_0+Y_0{}^*N_{p-1} \ldots N_0$. $Z_j$, $X_j$ and $N_j$ are the Bt bit words of Z, X and N, and are split up by the steps PZ1 to PZp.

PZ1) $Z'_1Z_0=X_1X_0+Y_0{}^*N_0$ loads $Y_0$ into the register 210, $X_1$ into the register 212, and $X_0$ into the register 211. The flip-flop circuit 262 is initialized at 0, and $N_0$ is loaded into the register 240. At the end of the computation, the contents of the register 212 that correspond to $Z_0$ are provided at an output.

PZ2) $Z'_2Z_1=X_2Z'_1+Y_0{}^*N_1$ loads $X_2$ into the register 212, and loads $N_1$ into the register 240. At the end of the computation, the contents of the register 212, which corresponds to $Z_1$, are provided at an output.

Pzp-1) $Z'_{p-1}Z_{p-2}=X_{p-1}Z'_{p-2}+Y_0{}^*N_{p-2}$ loads $X_{p-1}$ into the register 212, and loads $N_{p-2}$ into the register 240. At the end of the computation, the contents of the register 212, which corresponds to $Z_{p-2}$, are provided at an output.

Pzp) $Z_pZ_{p-1}=X_pZ'_{p-1}+Y_0{}^*N_{p-1}$loads $X_p$ values into the register 112 and successively loads the m words of k bits forming $N_{p-1}$ into the register 240. At the end of the computation, the contents of the register 212 corresponding to $Z_{p-1}$, and the contents of the register 211 corresponding to $Z_p$ are provided at an output. The carry value is also provided at the output. $Z'_1$ to $Z'_p$ are Bt bit words of intermediate computation that remain permanently in the coprocessor 4.

PS) If the carry value is equal to 0, and if $Z\backslash 2^{Bt}$ is smaller than N, then $S_{i+1}=Z\backslash 2^{Bt}$, else $S_{i+1}=Z\backslash 2^{Bt}-N$, with \ being an integer division.

The coprocessor 4 of FIG. 5 enables the performance of the computations about twice as fast as the coprocessor 4 of FIG. 4, and reduces the number of interventions of the processor 2 to manage data exchanges between the memory 3 and the coprocessor 4. Combinations between the processors of FIGS. 4 and 5 are possible. It is possible, for example, to transpose the register 240 to the coprocessor of FIG. 4 to reduce the number of data exchanges. Conversely, it is also possible to eliminate the register 240 from FIG. 5. However, this requires the loading, during the iterations, of the k bit words of the operand A.

Many shifts of elements can be done. The delay cell 254 may be placed at output of the multiplication circuit 219 provided that the words of the registers 216 and 217 are reversed. It is also possible to shift the addition circuit 261 to another place in the circuit. The flip-flop circuit 262 should be capable of recovering the carry value of the last of the addition circuits 230, 231 or 261. Similarly, the carry value should not necessarily be inserted into the first of the addition circuits, but in place of the least significant m*k bit word that has been added. It is also possible to use addition circuits having more than two inputs. It is then necessary to store the carry value of the last of the addition circuits used, and insert the carry value in the place of the least significant word added. The sizes of the operands may be different from one another. It is always possible to return to a size of m*k bits or carry out a number of iterations as a function of the size of the operands.

That which is claimed is:

1. A computation circuit for performing an operation of S=A*B+C, with A and B being integers encoded on at most m*k bits, C being an integer encoded on at most 2*m*k bits, and m and k being non-zero integers, the computation circuit comprising:
   a first m*k bit register for storing B, a second m*k bit register for storing at least one of m least significant k-bit words of C and an intermediate result, and a third m*k bit register for storing at least one of a least significant k-bit word of S and a most significant k-bit word of C;
   a fourth k bit register for storing a k-bit word of A;
   a first multiplication circuit for multiplying the data elements of said first and fourth bit registers;
   addition means;
   storing means;
   first linking means for connecting an output of said first multiplication circuit and an output of said second bit register to first and second inputs of said addition means for adding m least significant words of a result output from said first multiplication circuit and contents of said second bit register, and then connecting simultaneously the output of said first multiplication circuit, an output of said storing means and an output of said third bit register respectively to the first input, the second input and a third input of said addition means after the contents of the second bit register has been added, and for adding simultaneously a most significant word of the result output from said first multiplication circuit, a carry value stored in said storing means during a previous addition and a word of C to be added; and
   second linking means for connecting an output of said addition means to an input of said third bit register for storing a word of S in said third bit register, and then connecting the output of said addition means to an input of said second bit register for storing an updated intermediate result, and then connecting the output of said addition means to an input of said storing means for storing an updated carry value, if any, coming from an overflow of the result of the addition.

2. A circuit according to claim 1, further comprising a fifth (m*k) bit register for successively providing k bit words to said fourth register.

3. A circuit according to claim 1, further comprising:
   a sixth k bit register for storing a data element;
   a second multiplication circuit for multiplying the data element of said first register with the data element of said sixth register, the multiplication being performed simultaneously with the multiplication by said first multiplication circuit; and
   wherein said addition means further comprises means for adding, with a k bit shift, a result provided by said second multiplication circuit.

4. A modular arithmetic coprocessor comprising:
   a circuit for performing the computation of S=A*B+C, with A and B being integers encoded on at most m*k bits, C being an integer encoded on at most 2*m*k bits, and m and k being non-zero integers, said circuit comprising
   a first, a second and a third (m*k) bit register, each of said bit registers for storing a respective data element,
   a fourth k bit register for storing a respective data element;
   a first multiplication circuit for multiplying the data elements of said first and fourth registers,
   addition means,
   storing means,
   first linking means for connecting an output of said first multiplication circuit and an output of said second bit register to said addition means for adding m least significant words of a result output from said first multiplication circuit and contents of said second bit register, and then connecting simultaneously the output of said first multiplication circuit, an output of said storing means and an output of said third bit register to said addition means after the contents of said second bit register has been added, and for adding simultaneously a most significant word of the result output from said first multiplication circuit, a carry value stored in said storing means during a previous addition and a word of C to be added, and
   second linking means for connecting an output of said addition means to an input of said third bit register for storing a word of S in said third bit register, and then connecting the output of said addition means to an input of said second bit register for storing an updated intermediate result, and then connecting the output of said addition means to an input of said storing means for storing an updated carry value, if any, coming from an overflow of the result of the addition.

5. A modular arithmetic coprocessor according to claim 4, wherein said circuit further comprising a fifth (m*k) bit register for successively providing k bit words to said fourth register.

6. A modular arithmetic coprocessor according to claim 4, wherein said circuit further comprising:
   a sixth k bit register for storing a data element;
   a second multiplication circuit for multiplying the data element of said first register with the data element of said sixth register, the multiplication being performed simultaneously with the multiplication by said first multiplication circuit; and
   wherein said addition means further comprises means for adding, with a k bit shift, a result provided by said second multiplication circuit.

7. A modular arithmetic coprocessor according to claim 4, wherein said circuit comprises a processor and a memory connected thereto.

8. A method for computing A*B+C in a modular arithmetic coprocessor, with A and B being integers encoded on at most m*k bits, C being an integer encoded on at most 2*m*k bits, and m and k being non-zero integers, the method comprising the steps of:
   storing a respective data element in a first, a second and a third (m*k) bit register;

storing a data element in a fourth k bit register;

multiplying the data elements of the first and fourth bit registers in a first multiplication circuit;

adding successively the data elements of the second bit register and m least significant k bit words of a result output from the first multiplication circuit and then simultaneously adding a most significant k bit word of the result output from the multiplication circuit, a carry value previously stored, and a least significant word of C in the third bit register;

storing a least significant word of a result of the addition in the third bit register, then m most significant k-bit words of the result of the addition in the second bit register, and then an updated carry value, if any, coming from an overflow of the result of adding the data elements;

repeating the above steps after having changed the data element stored in the fourth bit register.

9. A method according to claim 8, further comprising storing an operand entirely in a fifth (m*k) register, and successively providing the operand to the fourth register.

10. A method according to claim 8, further comprising:

storing a data element in a sixth k bit register;

multiplying the data element of the first register with the data element of the sixth register in a second multiplication circuit, the multiplication being performed simultaneously with the multiplication by the first multiplication circuit; and adding, with a k bit shift, a result provided by the second multiplication circuit.

11. A method for computing A*B+C in a modular arithmetic coprocessor, with A and B being integers encoded on more than m*k bits, C being an integer encoded on at most 2*m*k bits, and m and k being non-zero integers, the method comprising the steps of:

storing a respective data element in a first, a second and a third (m*k) bit register;

storing a data element in a fourth k bit register;

multiplying the data elements of the first and fourth bit registers in a first multiplication circuit;

adding successively the data elements of the second bit register and a portion of a result output of the first multiplication circuit, and then simultaneously adding a second portion of the result output from the first multiplication circuit, a carry value previously stored, and a portion of the data element in the third bit register;

storing a portion of a result of the addition in the third bit register, then a portion of the result of the addition in the second bit register, and then an updated carry value, if any, coming from an overflow of the result of adding the data elements; and repeating the above steps after having changed the data element stored in the fourth bit register.

12. A method according to claim 11, further comprising storing an operand entirely in a fifth (m*k) register, and successively providing the operand to the fourth register.

13. A method according to claim 11, further comprising:

storing a data element in a sixth k bit register;

multiplying the data element of the first register with the data element of the sixth register in a second multiplication circuit, the multiplication being performed simultaneously with the multiplication by the first multiplication circuit; and adding, with a k bit shift, a result provided by the second multiplication circuit.

* * * * *